United States Patent
Liang et al.

(10) Patent No.: US 12,483,043 B2
(45) Date of Patent: Nov. 25, 2025

(54) BI-DIRECTIONAL ACTIVE BATTERY CELL BALANCER AND METHOD FOR BI-DIRECTIONAL CELL BALANCING

(71) Applicant: Renesas Electronics America Inc., Milpitas, CA (US)

(72) Inventors: Zhigang Liang, Fremont, CA (US); Jia Wei, Cary, NC (US); John H. Carpenter, Jr., Malabar, FL (US); Masaya Emi, Tokyo (JP)

(73) Assignee: Renesas Electronics America Inc., Milpitas, CA (US)

( * ) Notice: Subject to any disclaimer, the term of this patent is extended or adjusted under 35 U.S.C. 154(b) by 189 days.

(21) Appl. No.: 17/147,967

(22) Filed: Jan. 13, 2021

(65) Prior Publication Data

US 2022/0224124 A1 Jul. 14, 2022

(51) Int. Cl.
*H02J 7/00* (2006.01)

(52) U.S. Cl.
CPC .................. *H02J 7/0014* (2013.01)

(58) Field of Classification Search
CPC .................................................. H02J 7/0014
See application file for complete search history.

(56) References Cited

U.S. PATENT DOCUMENTS

| | | | | |
|---|---|---|---|---|
| 3,594,627 A | * | 7/1971 | Lesher | H02J 7/02 320/140 |
| 6,140,800 A | * | 10/2000 | Peterson | H02J 7/0018 320/128 |
| 6,404,165 B1 | * | 6/2002 | Shinpo | B60L 58/10 320/124 |
| 2004/0113586 A1 | * | 6/2004 | Chen | H02J 7/0019 320/118 |
| 2011/0109268 A1 | * | 5/2011 | Lee | H02J 7/345 320/116 |

(Continued)

FOREIGN PATENT DOCUMENTS

| | | | | | |
|---|---|---|---|---|---|
| WO | WO-2005031943 A1 | * | 4/2005 | | H02J 7/0016 |
| WO | WO-2018068523 A1 | * | 4/2018 | | H01M 10/425 |

OTHER PUBLICATIONS

Holt, "A Deeper Look into Difference Amplifiers" Analog Dialogue 48-02, Feb. 2014 (Year: 2014).*

(Continued)

*Primary Examiner* — Drew A Dunn
*Assistant Examiner* — Pamela J Jeppson
(74) *Attorney, Agent, or Firm* — SCULLY, SCOTT, MURPHY & PRESSER, P.C.

(57) ABSTRACT

Systems and methods for balancing a pair of battery cells are described. A controller can determine a voltage difference based on a first voltage of a first battery cell and a second voltage of a second battery cell. The controller can determine a current difference between current of an inductor and a current limit of the inductor, where the inductor can be connected to a node between the first and second battery cells. The controller can identify at least one switching elements among a plurality of switching elements based on the voltage difference and the current difference. The controller can activate the identified switching elements to perform battery cell balancing between the first battery cell and the second battery cell.

18 Claims, 7 Drawing Sheets

(56) References Cited

U.S. PATENT DOCUMENTS

| | | | | |
|---|---|---|---|---|
| 2013/0187612 A1* | 7/2013 | Aiura | ................... | H02J 7/0068 |
| | | | | 320/118 |
| 2013/0300344 A1* | 11/2013 | Sutardja | ............... | H02J 7/0014 |
| | | | | 320/103 |
| 2016/0043659 A1* | 2/2016 | Xu | ....................... | H02M 1/088 |
| | | | | 363/131 |
| 2016/0190828 A1* | 6/2016 | Nakamura | ........... | H02J 7/0014 |
| | | | | 320/118 |
| 2019/0115823 A1* | 4/2019 | Lidsky | ................. | H02M 3/158 |

OTHER PUBLICATIONS

Ma et al. "A hardware efficient lithium-ion cell balancing technique utilizing low-volume hybrid DC-DC converter," IECON 2017—43rd Annual Conference of the IEEE Industrial Electronics Society, 2017, pp. 566-570 (Year: 2017).*

Chen et al. WO-2018068523-A1 Machine translation, 2018 (Year: 2018).*

Taurand WO-2005031943-A1 Machine Translation, (Year: 2005).*

* cited by examiner

BI-DIRECTIONAL ACTIVE BATTERY CELL BALANCER AND METHOD FOR BI-DIRECTIONAL CELL BALANCING

BACKGROUND

Unless otherwise indicated herein, the materials described in this section are not prior art to the claims in this application and are not admitted to be prior art by inclusion in this section.

The present invention relates to cell balancing, and more particularly to an active battery cell balancer that balances voltage levels of two battery cells connected in series, and are components of a multi-cell battery pack.

Cell balancing is a technique in which the voltage levels of every individual cell connected in series to form a battery pack is maintained to be substantially equal in order to achieve maximum efficiency of the battery pack. When different battery cells are combined together to form the battery pack, the battery cells that are initially implemented can have the same chemistry and initial voltage values. Once the battery pack is installed and subjected to different charging and discharging cycles, the voltage values of the individual battery cells can vary due to various factors, such as, for example, state of charge (SOC) imbalance, internal resistance variation and temperature of the battery cells.

SUMMARY

In some examples, a device for battery cell balancing is generally described. The device can include a circuit coupled to a first battery cell and a second battery cell connected in series arrangement. The circuit can include a first switching element, a second switching element, a third switching element, and a fourth switching element. A terminal of the first switching element can be connected to a terminal of the first battery cell. The first, second, third, and fourth switching elements can be connected in series arrangement, and a terminal of the fourth switching element can be connected to a terminal of the second battery cell. The circuit can further include a capacitor, where a first terminal of the capacitor can be connected to a first node located between the first and second switching elements. A second terminal of the capacitor can be connected to a second node located between the third and fourth switching elements. The circuit can further include an inductor, where a first terminal of the inductor can be connected to a third node located between the second and third switching elements, and a second terminal of the inductor can be connected to a fourth node between the first and second battery cells. The first, second, third, and fourth switching elements can be configured to receive a plurality of driver signals from a controller to perform battery cell balancing between the first and second battery cells.

In some examples, a system for battery cell balancing is generally described. The system can include a circuit coupled to a first battery cell and a second battery cell. The circuit can include a first switching element, a second switching element, a third switching element, and a fourth switching element. A terminal of the first switching element can be connected to a terminal of the first battery cell. The first, second, third, and fourth switching elements can be connected in series arrangement, and a terminal of the fourth switching element can be connected to a terminal of the second battery cell. The circuit can further include a capacitor, where a first terminal of the capacitor can be connected to a first node located between the first and second switching elements. A second terminal of the capacitor can be connected to a second node located between the third and fourth switching elements. The circuit can further include an inductor, where a first terminal of the inductor can be connected to a third node located between the second and third switching elements. A second terminal of the inductor can be connected to a fourth node between the first and second battery cells. The system can further include a controller connected to the circuit. The controller can be configured to generate a plurality of driver signals to control the first, second, third, and fourth switching elements to perform battery cell balancing between the first and second battery cells.

In some examples, a method for balancing a pair of battery cells is generally described. The method can include detecting a first voltage of a first battery cell and a second voltage of a second battery cell. The first battery cell and the second battery cell can be connected in a series arrangement. The method can further include determining at least one voltage difference based on the first and second voltages. The method can further include detecting a current of an inductor in a circuit coupled to the first battery cell and the second battery cell. A first terminal of the inductor can be connected to a node located between the first and second battery cells. The method can further include determining a current difference between the current of the inductor and a current limit of the inductor. The method can further include generating a control signal based on the at least one voltage difference and the current difference. The method can further include performing pulse width modulation on the control signal with a predetermined signal to generate a plurality of pulse width modulated signals. The method can further include generating a plurality of driver signals based on the plurality of pulse width modulated signals. The method can further include using the plurality of driver signals to control a plurality of switching elements in the circuit coupled to the first battery cell and the second battery cell. The plurality of switching elements can include a first switching element, a second switching element, a third switching element, and a fourth switching element. The first switching element can be connected to the first battery cell. Th second switching element can be connected to the first switching element in series arrangement. A first terminal of a capacitor in the circuit can be connected to a node located between the first and second switching elements. The third switching element can be connected to the second switching element in series arrangement. A second terminal of the inductor can be connected to a node located between the second and third switching elements. The fourth switching element can be connected to the third switching element in series arrangement. A second terminal of the capacitor is connected to a node located between the third and fourth switching elements. The fourth switching element can be connected to the second battery cell.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
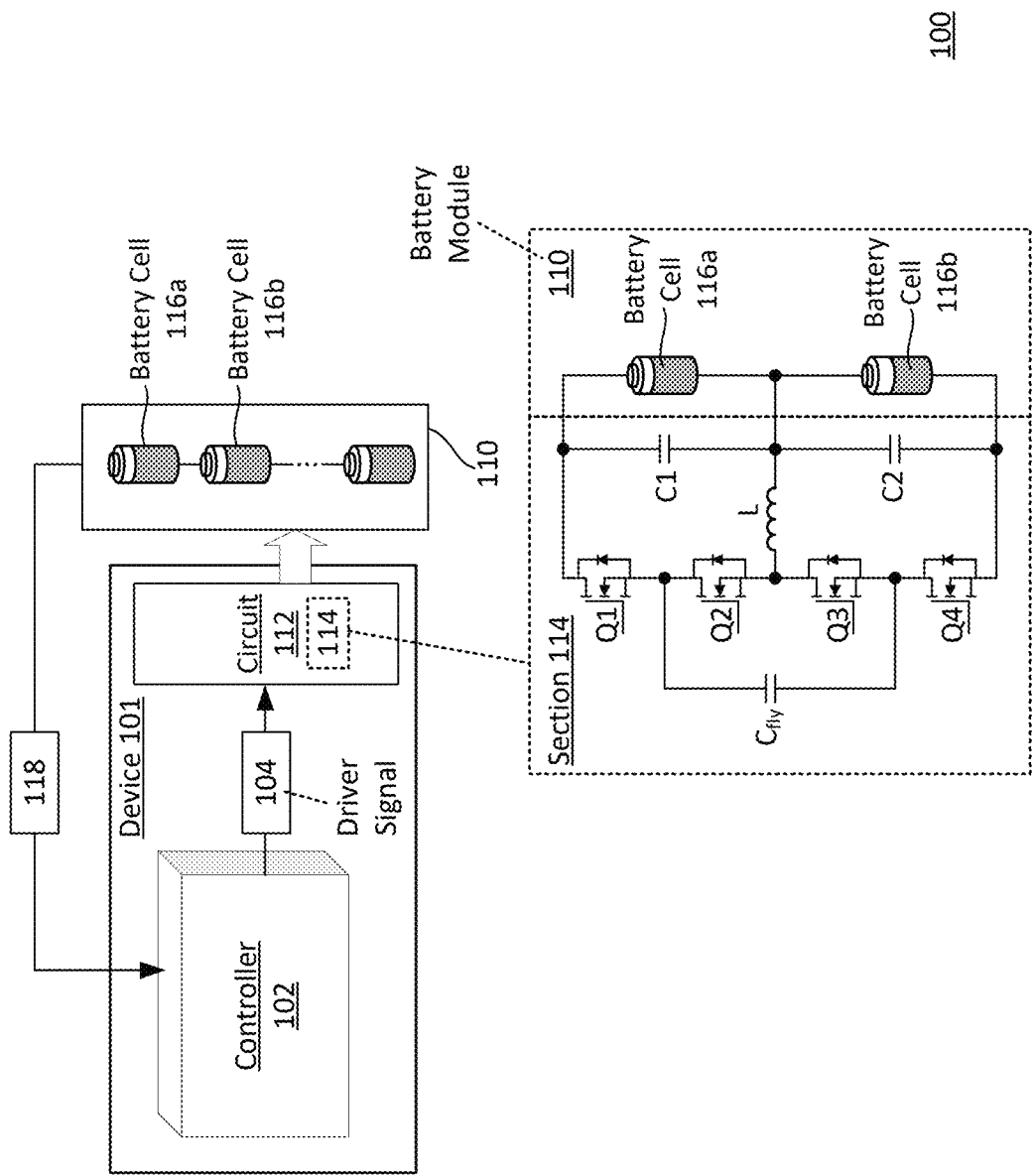
FIG. 1 is a diagram illustrating a system that can implement a bi-directional active battery cell balancer in accordance with an embodiment of the present invention.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

In an example, voltage values of the individual battery cells in a battery pack can vary due to various factors, such as, for example, state of charge (SOC) imbalance, internal resistance variation and temperature of the cells. These varying voltage levels of the battery cells can cause cell unbalancing. Unbalanced cells can lead to issues such as thermal runaway, cell degradation, incomplete charging of the battery pack, and/or incomplete use of the battery pack's energy. Various cell balancing techniques can be implemented to balance these varying voltage levels among the battery cells in the battery pack. These cell balancing techniques can be implemented in numerous applications including, for example, consumer electronics, and automotive electrical vehicles, which use more expensive and, somewhat less available, replacement batteries.

Cell balancing can be classified into a plurality of categories, such as passive cell balancing, active cell balancing, lossless cell balancing, and redox shuttle. Passive cell balancing and active cell balancing involve hardware designs for achieving cell balancing. Lossless cell balancing uses a combination of hardware and software to achieve the cell balancing. Redox shuttle involves altering the chemistry of the battery cell itself, typically the electrolyte chemistry, to achieve cell balancing. Passive cell balancing techniques can include, for example, charge shunting and charge limiting, which can be relatively simple techniques when compared to other cell balancing categories mentioned above. Passive cell balancing can be used where cost and size are major constraints. In passive cell balancing, the voltage levels of two battery cells connected in series can be balanced without using the excess charge of one of the battery cells.

Active cell balancing uses the excess charge of one of battery cells, among two battery cells connected in series, to achieve voltage level balancing. That is, in active cell balancing, the excess charge from one battery cell is transferred to the other battery cell of lower charge to equalize the two battery cells. This can be achieved by utilizing charge storage elements such as, for example, capacitors and inductors. However, active battery cell balancing architectures can consume a relatively large area of space, and charges can only be transferred in one direction—from the higher voltage battery cell to the lower voltage battery cell.

To be described in more detail below, a battery cell balancing technique can be implemented by a system 100 (shown in FIG. 1) described in accordance with the present disclosure. The system 100 can provide an active battery cell balancer (e.g., having a controller and a circuit coupled to a battery pack) that can be relatively compact, allowing the battery cell balancing technique described herein to fit in applications with limited board space and profile. For example, an inductor being used to facilitate the active battery cell balancer can be a relatively small inductor (e.g., thinner wires and/or smaller amount of loops), such that the active cell balancer can be designed in miniature size in order to fit into relatively small applications and devices, such as handheld, portable, wearable, or other devices of small or miniature size. The system 100 can also implement bi-directional charge transfer capability, such as moving charges either from a higher voltage battery cell to a lower voltage battery cell, or from the lower voltage battery cell to the higher voltage battery cell. Moreover, the system 100 can provide controllable voltage balance speed with controllable balance current, and can provide improved efficiency by moving charges between battery cells rather than dissipating the charges. Furthermore, the system 100 can be scalable from a battery pack containing two (a pair of) battery cells, to a battery pack containing multiple pairs of battery cells. Further, components can be added to the active battery cell balancer to accommodate additional pairs of battery cells in the battery pack. The utilization of the relatively small inductors in the active battery cell balancer can allow smaller components (e.g., small inductors) to be added along with other components (e.g., transistors) to accommodate additional pairs of battery cells in the battery pack. The system 100 can implement battery cell balancing for battery packs in applications such as, for example, consumer electronics, industrial applications, and automotive electrical vehicles, etc.

FIG. 1 is a diagram illustrating a system that can implement a bi-directional active battery cell balancer in accordance with an embodiment of the present invention. The system 100 can include a controller 102, a circuit 112, and a battery module (e.g., a battery pack) 110. The controller 102 can be coupled, or connected, to the circuit 112 and the circuit 112 can be coupled, or connected, to the battery module 110. The battery module 110 can include a plurality of battery cells, such as a battery cell 116a and a battery cell 116b. In some examples, the battery module 110 can be a rechargeable battery pack. The battery cells among the battery module 110 can be identical batteries, and can be connected in a series arrangement. In some examples, the controller 102 and/or the circuit 112 can be implemented as a battery balancer device 101 for the battery module 110. In some examples, the battery module 110 can be a battery pack for various applications or devices, such as consumer electronics, industrial applications, and automotive electrical vehicles, etc.

Focusing on a section 114 of the circuit 112 shown in FIG. 1, the section 114 can include a plurality of components that can be used to facilitate battery cell balancing between the battery cell 116*a* and the battery cell 116*b*. In an example shown in FIG. 1, the section 114 can include four switching elements labeled as Q1, Q2, Q3 and Q4, an inductor labeled as L, a capacitor labeled as $C_{fly}$, a capacitor labeled as C1, and a capacitor labeled as C2. The switching elements Q1, Q2, Q3 and Q4 can be connected in series arrangement. Each one of the switching elements Q1, Q2, Q3 and Q4 can be a metal oxide semiconductor field effect transistor (MOSFET). In the example shown in FIG. 1, each one of the switching elements Q1, Q2, Q3 and Q4 can be a N-channel MOSFET. In another example, each one of the switching elements Q1, Q2, Q3 and Q4 can be a P-channel MOSFET. The circuit 112 can include a plurality of copies of the section 114, where each copy of the section 114 can be connected to one pair of battery cells among the battery module 110. For example, if the battery module 110 includes 2N pairs of battery cells, then the circuit 112 can include at least N copies of the section 114.

The switching element Q1 can be connected to the battery cell 116*a*. In examples where the switching element Q1 is an N-channel MOSFET, a drain terminal of the switching element Q1 can be connected to a positive terminal (e.g., cathode) of the battery cell 116*a*. The switching element Q4 can be connected to the battery cell 116*b*. In examples where the switching element Q4 is an N-channel MOSFET, a source terminal of the switching element Q4 can be connected to a negative terminal (e.g., anode) of the battery cell 116*b*. A first terminal of the capacitor $C_{fly}$ can be connected to a first node located between the switching element Q1 and the switching element Q2, and a second terminal of the capacitor $C_{fly}$ can be connected to a second node located between the switching element Q3 and the switching element Q4. In examples where the switching elements Q1 and Q2 are N-channel MOSFETS, the source terminal of the switching element Q1 and the drain terminal of the switching element Q2 can be connected to the first node. In examples where the switching elements Q3 and Q4 are N-channel MOSFETS, the source terminal of the switching element Q3 and the drain terminal of the switching element Q4 can be connected to the second node. A first terminal of the inductor L can be connected to a node located between the switching element Q2 and the switching element Q3, and a second terminal of the inductor L can be connected to a node between a negative terminal of the battery cell 116*a* and a positive terminal of the battery cell 116*b*. In examples where the switching elements Q2 and Q3 are N-channel MOSFETS, the source terminal of the switching element Q2 and the drain terminal of the switching element Q3 can be connected to the node connected to the inductor L.

A first terminal of the capacitor C1 can be connected to a node located between the switching element Q1 and the battery cell 116*a*. In examples where the switching element Q1 is a N-channel MOSFET, the source terminal of the switching element Q1 and the cathode of the battery cell 116*a* can be connected to the node connected to capacitor C1. A second terminal of the capacitor C1 can be connected to the second terminal of the inductor L. A first terminal of the capacitor C2 can be connected to a node located between the switching element Q4 and the battery cell 116*b*. In examples where the switching element Q4 is a N-channel MOSFET, the drain terminal of the switching element Q4 and the anode of the battery cell 116*b* can be connected to the node connected to capacitor C2. A second terminal of the capacitor C2 can be connected to the second terminal of the inductor L. In an example embodiment, the capacitors C1 and C2 can be components operable to filter out frequency switching current ripple entering or leaving from the battery cells 116*a* and 116*b*, respectively, by absorbing these current ripple.

The controller 102 can be configured to detect voltage levels 118 of the battery cells among the battery module 110. The controller 102 can be further configured to detect a current level of the inductor L. The controller 102 can be configured to use the detected voltage levels 118, and the detected current level of the inductor L, to generate a plurality of driver signals 104. The driver signals 104 can be gate driver signals that can applied to the gate terminals of the switching elements Q1, Q2, Q3 and Q4 to operate the switching elements Q1, Q2, Q3 and Q4. The activation and/or deactivation of different combinations of the switching elements Q1, Q2, Q3 and Q4 can produce different closed loops to facilitate various operations of the battery cell balancer 101, as explained in more detail below.

The capacitor $C_{fly}$ can be charged by the battery cell 116*a* or the battery cell 116*b*. Charges from the capacitor $C_{fly}$ can be discharged to the battery cell 116*a* or the battery cell 116*b*. The controller 102 can detect which battery cell among the battery cells 116*a* and 116*b* has the higher voltage and, in response, determine which switching elements among the switching elements Q1, Q2, Q3 and Q4 shall be activated to facilitate transfer of charges from the higher voltage battery cell to the lower voltage battery cell. For example, if the capacitor $C_{fly}$ is not charged and the battery cell 116*a* has higher voltage than the battery cell 116*b*, the controller 102 can generate driver signals 104 to activate switching elements Q1 and Q3 and to deactivate the switching elements Q2 and Q4. Activation of the switching elements Q1 and Q3, and deactivation of the switching elements Q2 and Q4, forms a closed loop that allows current to flow from the battery cell 116*a* to the capacitor $C_{fly}$, through the activated switching element Q1, to charge the capacitor $C_{fly}$. The current can also flow through the capacitor $C_{fly}$ and the switching element Q3 to energize or charge the inductor L.

In response to the capacitor $C_{fly}$ being charged, the controller 102 can modify the driver signals 104 to activate the switching elements Q2 and Q4 and to deactivate the switching elements Q1 and Q3. In an example, the controller 102 can detect that the current energizing the inductor L is greater than a current limit, and based on this detection, determine that the capacitor $C_{fly}$ is charged. In an example, the current limit can be adjusted to control a balancing speed to balance the battery cells 116*a* and 116*b*. For example, increasing the current limit can allow an increased amount of current to flow through the inductor L. This increased amount of current flow though the inductor L can increase movement of battery cell voltages to increase cell balancing speed. Conversely, decreasing the current limit can decrease the amount of current flowing through the inductor L, causing a decrease in balancing speed. Accordingly, the current limit can be set based on a desired cell balancing speed and the selection of current limit may take into account the desired balancing speed and/or other constraints, such as allowed thermal and/or component capabilities of the system 100. When $C_{fly}$ is charged, activation of the switching elements Q2 and Q4, and deactivation of the switching elements Q1 and Q3, can form a closed loop that allows the capacitor $C_{fly}$ to discharge to the battery cell 116*b*. By sequentially activating different combinations (e.g., two or more) of the switching elements Q1, Q2, Q3 and Q4, the charge provided by the battery cell 116*a* to the capacitor $C_{fly}$ can be transferred to the battery cell 116*b*.

Similarly, in another example, if the capacitor $C_{fly}$ is not charged and the battery cell 116b has higher voltage than the battery cell 116a, the controller 102 can generate driver signals 104 to activate switching elements Q2 and Q4 and to deactivate the switching elements Q1 and Q3. Activation of the switching elements Q2 and Q4, and deactivation of the switching elements Q1 and Q3, forms a closed loop that allows current to flow from the battery cell 116b to the capacitor $C_{fly}$, through the inductor L and the activated switching element Q2, to charge the capacitor $C_{fly}$. The current flowing though the inductor L can energize or charge the inductor L. In response to the capacitor $C_{fly}$ being charged, the controller 102 can modify the driver signals 104 to activate the switching elements Q1 and Q3 and to deactivate the switching elements Q2 and Q4. In an example, the controller 102 can detect that the current energizing the inductor L is greater than a current limit, and based on this detection, determine that the capacitor $C_{fly}$ is charged. When $C_{fly}$ is charged, activation of the switching elements Q1 and Q3, and deactivation of the switching elements Q2 and Q4, can form a closed loop that allows the capacitor $C_{fly}$ to discharge to the battery cell 116a. By sequentially activating different (e.g., two or more) combinations of the switching elements Q1, Q2, Q3 and Q4, charges can be transferred from the battery cell 116a to the battery cell 116b, or from the battery cell 116b to the battery cell 116a, providing bi-directional transfer of charges to balance the pair of battery cells 116a and 116b.

The continuous cell balancing (e.g., repeatedly transferring charges from battery cell 116a to 116b, then vice versa) can allow the current flowing through the inductor L to switch at a relatively high frequency. This high switching frequency can reduce ripple current, leading to a reduction of core loss induced by the ripple current. Due to the reduced ripple current, a relatively small inductor (e.g., thinner wires and/or less loops) may be sufficient to account for the reduced amount of ripple current caused by the cell balancing operations disclosed herein. Accordingly, the usage of the relatively small inductor can reduce a circuit board area occupied by the section 114 and the circuit 112, thus reducing a size of the battery balancer device 101.

Figure 2:
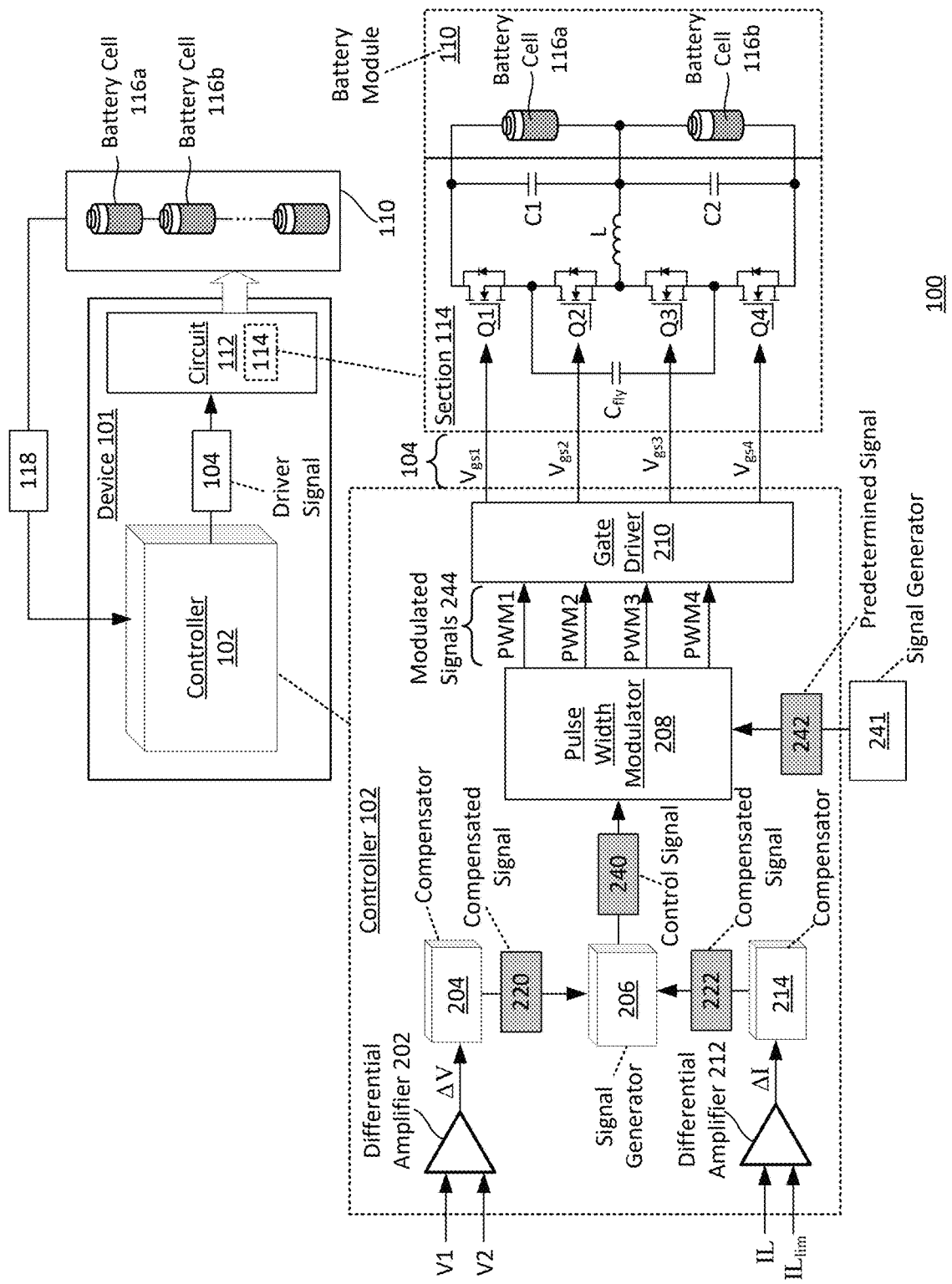
FIG. 2 is a control block diagram illustrating a bi-directional active battery cell balancer in accordance with an embodiment of the present invention.

FIG. 2 is a control block diagram illustrating a bi-directional active battery cell balancer in accordance with an embodiment of the present invention. In an example embodiment shown in FIG. 2, the controller 102 can include a differential amplifier 202, a compensator 204, a differential amplifier 212, a compensator 214, a signal generator 206, a pulse width modulator 208, and one or more gate drivers 210. The controller 102 can receive or detect a voltage V1 of the battery cell 116a, and can receive or detect a voltage V2 of the battery cell 116b. The differential amplifier 202 can be configured to determine a voltage difference between the voltages V1 and V2, and amplify the voltage difference to generate an amplified voltage difference ΔV. Further, the output of the differential amplifier 202 can indicate whether V1 or V2 has the greater value. For example, if the voltage V1 enters the negative input terminal of the differential amplifier 212 and the voltage difference is negative, then V1 is greater than V2. The amplified voltage difference ΔV can be sent to the compensator 204. The compensator 204 can be configured to perform compensation techniques, such as reducing steady state error, reducing resonant peak, reducing rise time, etc., on the amplified voltage difference ΔV to generate a compensated signal 220.

The controller 102 can further receive or detect a current IL of the inductor L, can receive a current limit $IL_{lim}$ associated with the inductor L. The current IL can be current flowing through the inductor L. The current limit $IL_{lim}$ can be a predetermined value programmed into the controller 102 and stored in a local memory of the controller 102. The differential amplifier 212 can be configured to determine a current difference between the current IL and the current limit $IL_{lim}$ and amplify the current difference to generate an amplified current difference ΔI. The differential amplifier 214 can determine if the current IL is greater than the current limit $IL_{lim}$. For example, if the current IL enters a negative input of the differential amplifier 212 and the current difference is negative, then the current IL is greater than the current limit $IL_{lim}$. The current IL being greater than the current limit $IL_{lim}$ can indicate that the inductor L is charged or energized. Further, the inductor L being charged or energized can indicate that the capacitor $C_{fly}$ is charged. The amplified current difference ΔI can be sent to the compensator 214. The compensator 214 can be configured to perform compensation techniques, such as reducing steady state error, reducing resonant peak, reducing rise time, etc., on the amplified current difference ΔI and output a compensated signal 222.

The signal generator 206 can be configured to generate a control signal 240 based on the amplified current difference ΔI or the compensated signal 222, and the voltage difference ΔV or the compensated signal 220. The following examples correspond to a configuration where the voltage V1 enters the negative input terminal of the differential amplifier 212. In an example, the signal generator 206 can detect that the amplified current difference ΔI is negative indicating that the current IL is greater than the current limit $IL_{lim}$. The signal generator 206 can further detect that the amplified voltage difference ΔV is negative indicating that V1 is greater than V2. Both of the current difference ΔI and the voltage difference being negative can indicate that the capacitor $C_{fly}$ is charged, and there may be a need to discharge the capacitor $C_{fly}$ to the battery cell 116b. In response to detecting that the current difference ΔI and the voltage difference are both negative, the signal generator 206 can generate the control signal 240 to have a waveform that can facilitate activation of the switching elements Q2 and Q4 and deactivation of the switching elements Q1 and Q3. For example, the control signal 240, when pulse width modulated with a predetermined waveform, can result in a pulse width modulated signal that activates the switching elements Q2 and Q4 and deactivates the switching elements Q1 and Q3.

In another example, the signal generator 206 can detect that the amplified current difference ΔI is positive indicating that the current IL is less than the current limit $IL_{lim}$. The signal generator 206 can further detect that the amplified voltage difference ΔV is negative indicating that V1 is greater than V2. The current difference ΔI being positive and the voltage difference being negative can indicate that the capacitor $C_{fly}$ is not charged, and there may be a need to charge the capacitor $C_{fly}$ using charges from the battery cell 116a. In response to detecting that the current difference ΔI being positive and the voltage difference being negative, the signal generator 206 can generate the control signal 240 to have a waveform that can facilitate activation of the switching elements Q1 and Q3 and deactivation of the switching elements Q2 and Q4. For example, the control signal 240, when pulse width modulated with a predetermined waveform, can result in a pulse width modulated signal that activates the switching elements Q1 and Q3 and deactivates the switching elements Q2 and Q4.

In another example, the signal generator 206 can detect that the amplified current difference ΔI is negative indicating that the current IL is greater than the current limit $IL_{lim}$. The signal generator 206 can further detect that the amplified voltage difference ΔV is positive indicating that V1 is less than V2. The current difference ΔI being negative and the voltage difference being positive can indicate that the capacitor $C_{fly}$ is charged, and there may be a need to discharge the capacitor $C_{fly}$ to the battery cell 116a. In response to detecting that the current difference ΔI is negative and the voltage difference is positive, the signal generator 206 can generate the control signal 240 to have a waveform that can facilitate activation of the switching elements Q1 and Q3 and deactivation of the switching elements Q2 and Q4. For example, the control signal 240, when pulse width modulated with a predetermined waveform, can result in a pulse width modulated signal that activates the switching elements Q1 and Q3 and deactivates the switching elements Q2 and Q4.

In another example, the signal generator 206 can detect that the amplified current difference ΔI is positive indicating that the current IL is less than the current limit $IL_{lim}$. The signal generator 206 can further detect that the amplified voltage difference ΔV is positive indicating that V1 is less than V2. The current difference ΔI and the voltage difference being positive can indicate that the capacitor $C_{fly}$ is not charged, and there may be a need to charge the capacitor $C_{fly}$ using the battery cell 116b. In response to detecting that the current difference ΔI and the voltage difference are both positive, the signal generator 206 can generate the control signal 240 to have a waveform that can facilitate activation of the switching elements Q2 and Q4 and deactivation of the switching elements Q1 and Q3. For example, the control signal 240, when pulse width modulated with a predetermined waveform, can result in a pulse width modulated signal that activates the switching elements Q2 and Q4 and deactivates the switching elements Q1 and Q3.

The pulse width modulator 208 can receive the control signal 240 from the signal generator 206. The pulse width modulator 208 can perform pulse width modulation on the control signal 240 using a predetermined signal 242 to generate a plurality of pulse width modulated signals 244. The plurality of pulse width modulated signals 244 can include four pulse width modulated signals, denoted as PWM1, PWM2, PWM3 and PWM4. The predetermined signal 242 can be a signal that has a triangle waveform or sawtooth waveform. In an example, the frequency of the predetermined signal 242 can define a speed in which the switching elements Q1, Q2, Q3 and Q4 are being toggled for activation or deactivation. In an example embodiment, the controller 102 can receive the predetermined signal 242 from a signal generator 241, where the signal generator 241 can be located in the controller 102 or outside of the controller 102.

The pulse width modulator 208 can send the pulse width modulated signals PWM1, PWM2, PWM3 and PWM4 to the gate drivers 210. The gate drivers 210 can be configured to generate the plurality of driver signals 104 using the pulse width modulated signals 244. For example, the gate drivers 210 can amplify the pulse width modulated signals PWM1, PWM2, PWM3 and PWM4 to produce the drive signals 104, where the drive signals 104 can include gate-source voltages $V_{gs1}$, $V_{gs2}$, $V_{gs3}$ and $V_{gs4}$. The gate-source voltages $V_{gs1}$, $V_{gs2}$, $V_{gs3}$ and $V_{gs4}$ may be voltages that are sufficient to switch the switching elements Q1, Q2, Q3 and Q4, respectively. For example, the voltage $V_{gs1}$ can be greater than a threshold voltage of the switching element Q1 in order to switch on or activate the switching element Q1.

Figure 3:
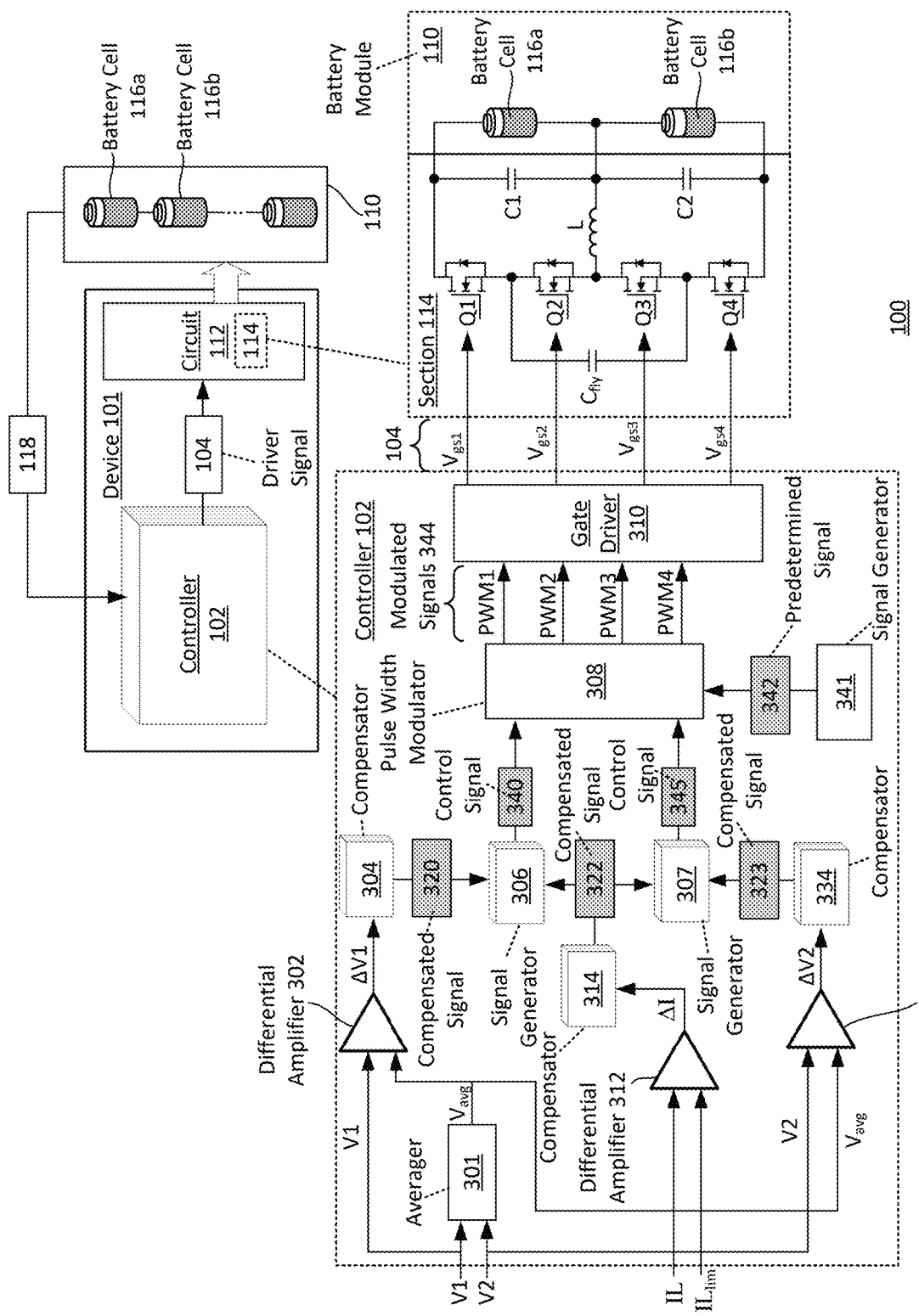
FIG. 3 is another control block diagram illustrating a bi-directional active battery cell balancer in accordance with an embodiment of the present invention.

FIG. 3 is another control block diagram illustrating a bi-directional active battery cell balancer in accordance with an embodiment of the present invention. In an example embodiment shown in FIG. 3, the controller 102 can include an averager 301, a differential amplifier 302, a compensator 304, a differential amplifier 312, a compensator 314, a differential amplifier 332, a compensator 334, a signal generator 306, a signal generator 307, a pulse width modulator 308, and one or more gate drivers 310. The controller 102 can receive or detect a voltage V1 of the battery cell 216a, and can receive or detect a voltage V2 of the battery cell 216b. The averager 301 can be a circuit configured to determine an average voltage $V_{avg}$ between the voltage V1 and the voltage V2.

The differential amplifier 302 can be configured to determine a voltage difference between the voltages V1 and $V_{avg}$, and amplify this voltage difference to generate an amplified voltage difference ΔV1. The voltage difference between the voltages V1 and $V_{avg}$ can indicate whether a voltage level of the battery cell 116a is above average or below average. For example, if the voltage V1 enters the negative input terminal of the differential amplifier 302 and the voltage difference is negative, then the voltage V1 is above the average voltage $V_{avg}$, indicating that the voltage level of the battery cell 116a is above average. If the voltage V1 enters the negative input terminal of differential amplifier 302 and the voltage difference is positive, then the voltage V1 is less the average voltage $V_{avg}$, indicating that the voltage level of the battery cell 116a is below average. The amplified voltage difference ΔV1 can be sent to the compensator 304. The compensator 304 can be configured to perform compensation techniques, such as reducing steady state error, reducing resonant peak, reducing rise time, etc., on the amplified voltage difference ΔV1 to generate a compensated signal 320.

The differential amplifier 332 can be configured to determine a voltage difference between the voltages V2 and $V_{avg}$, and amplify this voltage difference to generate an amplified voltage difference ΔV2. The voltage difference between the voltages V2 and $V_{avg}$ can indicate whether the voltage level of the battery cell 116b is above average or below average. For example, if the voltage V2 enters the negative input terminal of differential amplifier 332 and the voltage difference is negative, then the voltage V2 is above the average voltage $V_{avg}$, indicating that the voltage level of the battery cell 116b is above average. If the voltage V2 enters the negative input terminal of differential amplifier 332 and the voltage difference is positive, then the voltage V2 is less the average voltage $V_{avg}$, indicating that the voltage level of the battery cell 116b is below average. The amplified voltage difference ΔV2 can be sent to the compensator 334. The compensator 334 can be configured to perform compensation techniques, such as reducing steady state error, reducing resonant peak, reducing rise time, etc., on the amplified voltage difference ΔV2 to generate a compensated signal 323.

The controller 102 can further receive or detect a current IL of the inductor L, can receive a current limit $IL_{lim}$ associated with the inductor L. The current IL can be current flowing through the inductor L. The current limit $IL_{lim}$ can be a predetermined value programmed into the controller 102 and stored in a local memory of the controller 102. The differential amplifier 312 can be configured to determine a current difference between the current IL and the current limit $IL_{lim}$ and amplify the current difference to generate an amplified current difference ΔI. The differential amplifier 314 can determine if the current IL is greater than the current limit $IL_{lim}$. For example, if the current IL enters the negative input of the differential amplifier 312 and the current difference is negative, then the current IL is greater than the current limit $IL_{lim}$. The current IL being greater than the current limit $IL_{lim}$ can indicate that the inductor L is charged or energized. Further, the inductor L being charged or energized can indicate that the capacitor $C_{fly}$ is charged. The amplified current difference ΔI can be sent to the compensator 314. The compensator 314 can be configured to perform compensation techniques, such as reducing steady state error, reducing resonant peak, reducing rise time, etc., on the amplified current difference ΔI and output a compensated signal 322.

The signal generator 306 can be configured to generate the control signal 340 based on the amplified current difference ΔI and the compensated signal 320 or ΔV1. The following examples correspond to a configuration where the voltage V1 enters the negative input terminal of the differential amplifier 302. In an example, the signal generator 306 can detect that the amplified current difference ΔI is negative indicating that the current IL is greater than the current limit $IL_{lim}$. The signal generator 306 can further detect that the amplified voltage difference ΔV1 is negative indicating that V1 is greater than $V_{avg}$. The current difference ΔI and the voltage difference ΔV1 being negative can indicate that the capacitor $C_{fly}$ is charged, and the battery cell 116a is performing at above average level. Thus, there may be no need to discharge the capacitor $C_{fly}$ to the battery cell 116a. In response to detecting there may be no need to discharge the capacitor $C_{fly}$ to the battery cell 116a, the signal generator 306 can either idle (e.g., not outputting a control signal) or generate the control signal 340 to be the same as a previously generated version of the control signal 340, to maintain a current performance level of the battery cell 116a.

In another example, the signal generator 306 can detect that the amplified current difference ΔI is negative indicating that the current IL is greater than the current limit $IL_{lim}$. The signal generator 306 can further detect that the amplified voltage difference ΔV1 is positive indicating that V1 is less than $V_{avg}$. The current difference ΔI being negative and the voltage difference ΔV1 being positive can indicate that the capacitor $C_{fly}$ is charged, and the battery cell 116a is performing at below average level. Thus, there may be a need to discharge the capacitor $C_{fly}$ to the battery cell 116a. In response to detecting there may be a need to discharge the capacitor $C_{fly}$ to the battery cell 116a, the signal generator 306 can generate the control signal 340 to have a waveform that can facilitate activation of the switching elements Q1 and Q3. For example, the control signal 340, when pulse width modulated with a predetermined waveform, can result in a pulse width modulated signal that activates the switching elements Q1 and Q3.

In another example, the signal generator 306 can detect that the amplified current difference ΔI is negative indicating that the current IL is greater than the current limit $IL_{lim}$. The signal generator 306 can further detect that the amplified voltage difference ΔV1 is negative indicating that V1 is greater than $V_{avg}$. The current difference ΔI and the voltage difference ΔV1 being negative can indicate that the capacitor $C_{fly}$ is charged, and the battery cell 116a is performing at above average level. Thus, there may be no need to discharge the capacitor $C_{fly}$ to the battery cell 116a. In response to detecting there may be no need to discharge the capacitor $C_{fly}$ to the battery cell 116a, the signal generator 306 can either idle (e.g., not outputting a control signal) or generate the control signal 340 to be the same as a previously generated version of the control signal 340, to maintain a current performance level of the battery cell 116a.

The signal generator 307 can be configured to generate the control signal 345 based on the amplified current difference ΔI and the compensated signal 323 or ΔV2. The following examples correspond to a configuration where the voltage V2 enters the negative input terminal of the differential amplifier 332. In an example, the signal generator 307 can detect that the amplified current difference ΔI is negative indicating that the current IL is greater than the current limit $IL_{lim}$. The signal generator 307 can further detect that the amplified voltage difference ΔV2 is negative indicating that V2 is greater than $V_{avg}$. The current difference ΔI and the voltage difference ΔV2 being negative can indicate that the capacitor $C_{fly}$ is charged, and the battery cell 116b is performing at above average level. Thus, there may be no need to discharge the capacitor $C_{fly}$ to the battery cell 116b. In response to detecting there may be no need to discharge the capacitor $C_{fly}$ to the battery cell 116b, the signal generator 307 can either idle (e.g., not outputting a control signal) or generate the control signal 345 to be the same as a previously generated version of the control signal 340, to maintain a current performance level of the battery cell 116b.

In another example, the signal generator 307 can detect that the amplified current difference ΔI is negative indicating that the current IL is greater than the current limit $IL_{lim}$. The signal generator 307 can further detect that the amplified voltage difference ΔV2 is positive indicating that V2 is less than $V_{avg}$. The current difference ΔI being negative and the voltage difference ΔV2 being positive can indicate that the capacitor $C_{fly}$ is charged, and the battery cell 116b is performing at below average level. Thus, there may be a need to discharge the capacitor $C_{fly}$ to the battery cell 116b. In response to detecting there may be a need to discharge the capacitor $C_{fly}$ to the battery cell 116b, the signal generator 307 can generate the control signal 345 to have a waveform that can facilitate activation of the switching elements Q2 and Q4. For example, the control signal 345, when pulse width modulated with a predetermined waveform, can result in a pulse width modulated signal that activates the switching elements Q2 and Q4.

The pulse width modulator 308 can receive the control signals 340 and 345 from the signal generators 306 and 307, respectively. The pulse width modulator 308 can perform pulse width modulation on the control signals 340 and/or 345 using one or more predetermined signals 342 to generate a plurality of pulse width modulated signals 344. The plurality of pulse width modulated signals 344 can include four pulse width modulated signals, denoted as PWM1, PWM2, PWM3 and PWM4. The predetermined signals 342 can be signals having a triangle waveform or sawtooth waveform. In an example, the frequency of the predetermined signals 342 can define a speed in which the switching elements Q1, Q2, Q3 and Q4 are being toggled for activation or deactivation. In an example embodiment, the controller 102 can receive the predetermined signals 342 from a signal generator 341, where the signal generator 341 can be located in the controller 102 or outside of the controller 102. In an example, the control signals 340 and 345 can have the same signal amplitudes or values but opposite polarity. Thus, either one of the control signals 340 and 345 can be used for the pulse width modulator 308 to generate the pulse width modulated signals PWM1, PWM2, PWM3 and PWM4.

The pulse width modulator 308 can send the pulse width modulated signals PWM1, PWM2, PWM3 and PWM4 to the gate drivers 310. The gate drivers 310 can be configured to generate the plurality of driver signals 104 using the pulse width modulated signals 344. For example, the gate drivers 310 can amplify the pulse width modulated signals PWM1, PWM2, PWM3 and PWM4 to produce the drive signals 104, where the drive signals 104 can include gate-source voltages $V_{gs1}$, $V_{gs2}$, $V_{gs3}$ and $V_{gs4}$. The gate-source voltages $V_{gs1}$, $V_{gs2}$, $V_{gs3}$ and $V_{gs4}$ may be voltages that are sufficient to switch the switching elements Q1, Q2, Q3, Q4. For example, the voltage $V_{gs1}$ can be greater than a threshold voltage of the switching element Q1 in order to switch on or activate the switching element Q1.

Figure 4:
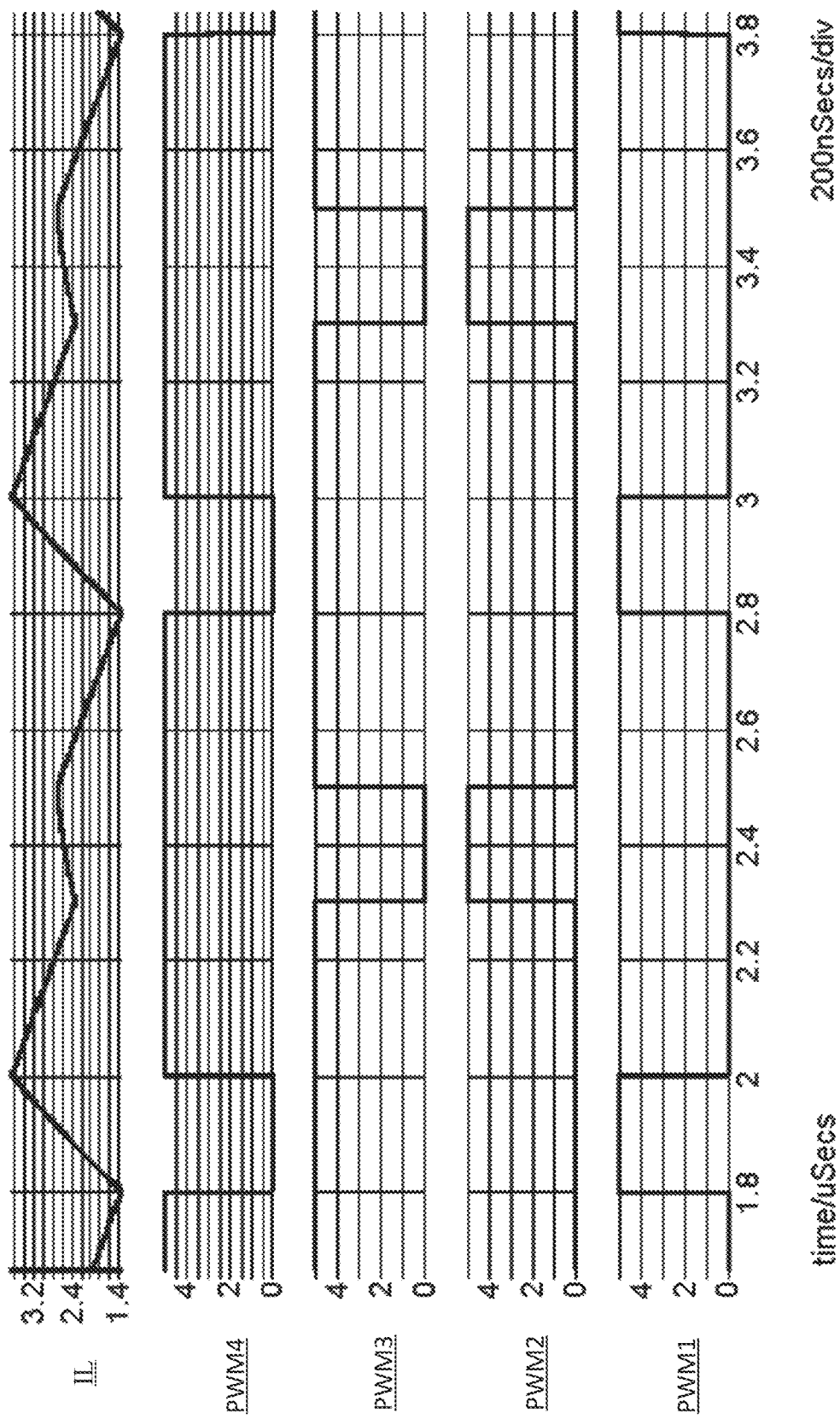
FIG. 4 is a diagram illustrating one or more signals resulting from an implementation of a bi-directional active battery cell balancer in accordance with an embodiment of the present invention.

FIG. 4 is a diagram illustrating one or more signals resulting from an implementation of a bi-directional active battery cell balancer in accordance with an embodiment of the present invention. A timing diagram 400 illustrates a plurality of signals representing various activities during an implementation of the system shown in FIG. 1. The signal IL among the timing diagram 400 represents the current flowing through the inductor L (shown in FIGS. 1-3). The signals PWM1, PWM2, PWM3 and PWM4 are the pulse width modulated signals shown in FIGS. 1-3. In the timing diagram 400, between the time 1.8 microseconds (μs) and 2 μs, the inductor current IL increases when the signals PWM3 and PWM1 are "high", and when the signals PWM2 and PWM4 are 'low". This indicates that current is flowing through the inductor L when the switching elements Q1 and Q3 (shown in FIGS. 1-3) are activated and when the switching elements Q2 and Q4 are deactivated. When the switching elements Q1 and Q3 are activated, the current flowing through the inductor L can be supplied by either the battery cell 116a (shown in FIGS. 1-3) or by the capacitor $C_{fly}$.

In the timing diagram 400, between the time 2 μs and 2.3 μs, the inductor current IL decreases when the signals PWM3 and PWM4 are "high", and when the signals PWM1 and PWM2 are 'low". This indicates that the inductor L is being discharged when the switching elements Q3 and Q4 are activated and when the switching elements Q1 and Q1 are deactivated. When the switching elements Q3 and Q4 are activated, the inductor L can discharge to the battery cell 116b (shown in FIGS. 1-3). Between the time 2.3 μs and 2.5 μs, the inductor current IL slightly increases when the signals PWM2 and PWM4 are "high", and when the signals PWM1 and PWM3 are 'low". This indicates that current is flowing through the inductor L when the switching elements Q2 and Q4 are activated and when the switching elements Q1 and Q3 are deactivated. When the switching elements Q2 and Q4 are activated, the current flowing through the inductor L can be supplied by either the battery cell 116b or by the capacitor $C_{fly}$. Between the time 2.5 μs and 2.8 μs, the inductor current IL decreases when the signals PWM3 and PWM4 are "high", and when the signals PWM1 and PWM2 are 'low". This indicates that the inductor L is being discharged when the switching elements Q3 and Q4 are activated and when the switching elements Q1 and Q1 are deactivated. When the switching elements Q3 and Q4 are activated, the inductor L can discharge to the battery cell 116b.

Figure 5:
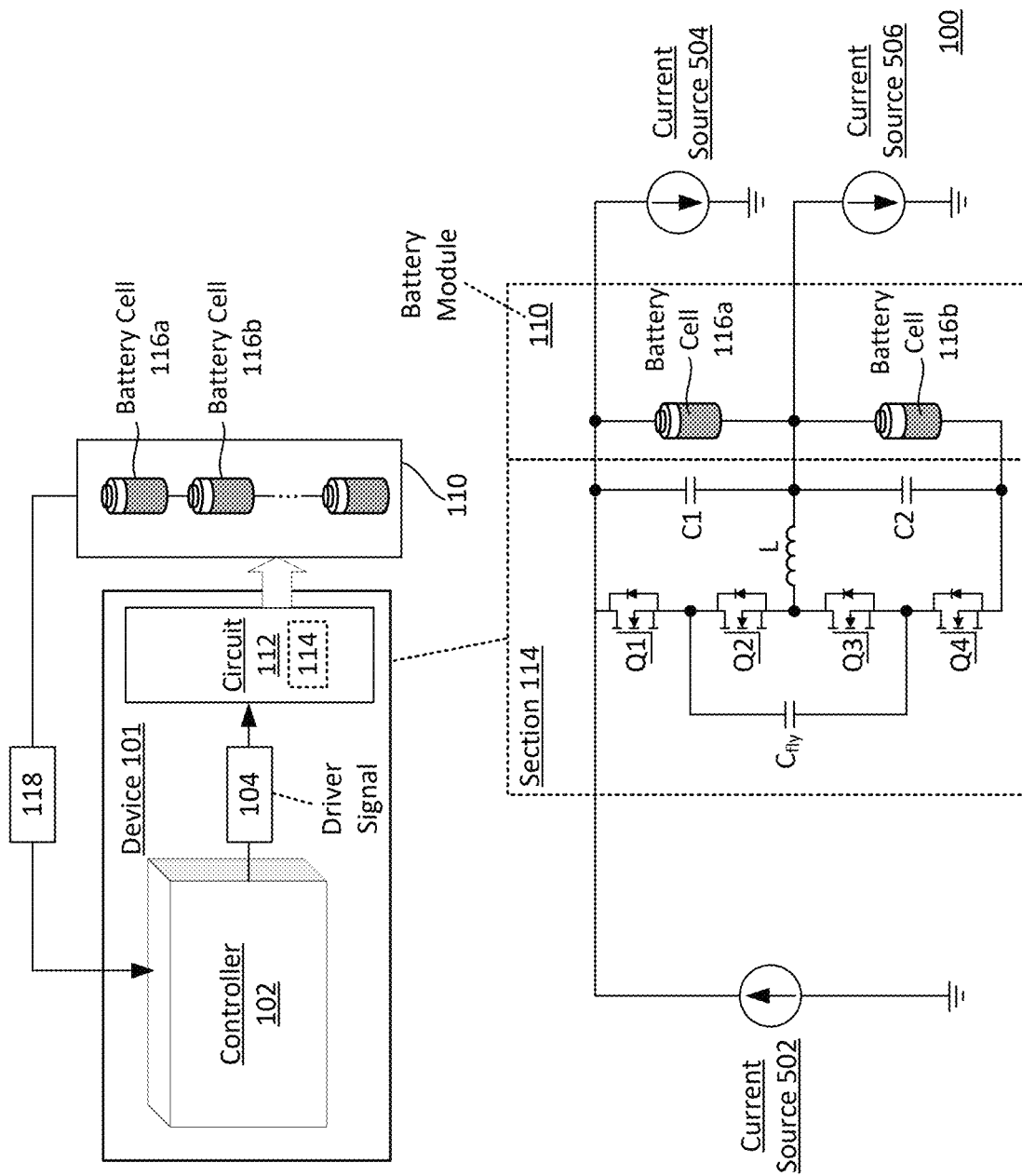
FIG. 5 is a diagram illustrating an example implementation of the system of FIG. 1 in accordance with an embodiment of the present invention.

FIG. 5 is a diagram illustrating an example implementation of the system 100 of FIG. 1 in accordance with an embodiment of the present invention. The system 100 can be implemented to balance the battery cells 116a and 116b under various loading and charging conditions. In an example shown in FIG. 5, the system 100 can be connected to current sources 502, 504 and 506. The current source 502 can be configured to charge the battery cells 116a and 116b, and the current sources or loads 504, 506 can draw current from the battery cells 116a, 116b, respectively. The current sources 502, 504 and 506 can be connected to the system 100 simultaneously, or one or more of the current sources 502, 505 and 506 can be connected to the system 100. As the current source 502 charges the battery cells 116a, 116b, or as the current sources draw from the battery cells 116a, 116b, the system 100 can be implemented to ensure that the battery cells 116a, 116b are balanced (e.g., having substantially equal voltages).

Figure 6:
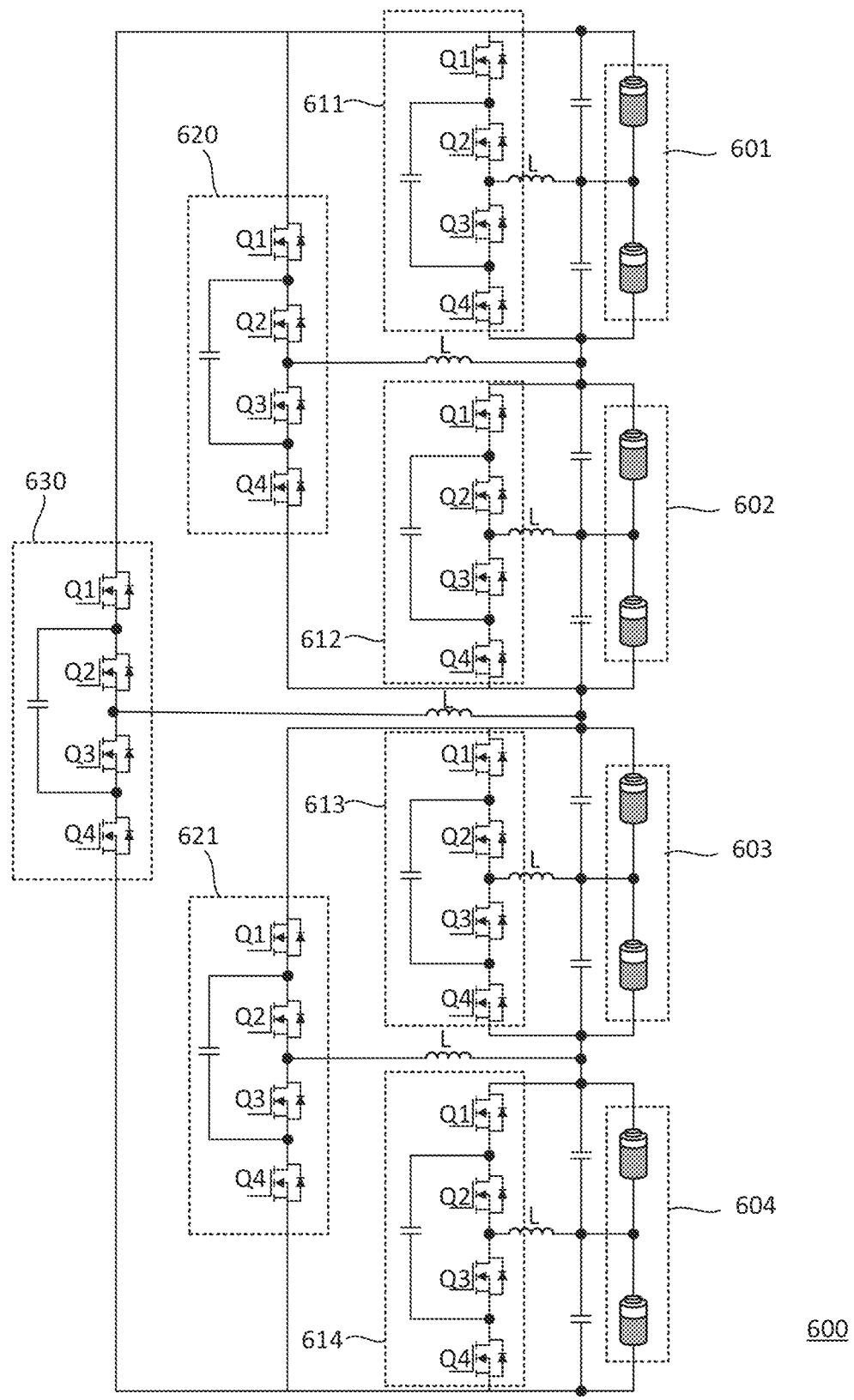
FIG. 6 is a diagram illustrating a modular system that can implement one or more bi-directional active battery cell balancer in accordance with an embodiment of the present invention.

FIG. 6 is a diagram illustrating a modular system that can implement one or more bi-directional active battery cell balancer in accordance with an embodiment of the present invention. A modular system ("system") 600 can include a plurality of cell balancer circuits (e.g., 114 shown in FIGS. 1-3). The cell balancer circuits can be arranged in a hierarchy having different levels and leading to a pair of adjacent battery cells. For example, cell balancer circuits 611, 612, 613 and 614, can be connected to pairs of adjacent battery cells 601, 602, 603 and 604, respectively. The cell balance circuits 611, 612, 613 and 614 can be connected to a pair of adjacent battery cells 602. The cell balancer circuits 611, 612, 613 and 614 can be connected to a respective controller (e.g., controller 104 shown in FIGS. 1-3) configured to control the switching elements among the cell balancer circuits 611, 612, 613 and 614.

A cell balancer circuit 620 can be connected to the cell balancer circuits 611 and 612, where the cell balancer circuit 620 can be connected to its own controller (e.g., controller 104 shown in FIGS. 1-3) configured to control the switching elements among the cell balancer circuits 620. A cell balancer circuit 621 can be connected to the cell balancer circuits 613 and 614, where the cell balancer circuit 621 can be connected to its own controller (e.g., controller 104 shown in FIGS. 1-3) configured to control the switching elements among the cell balancer circuits 621. Another cell balancer circuit 630 can be connected to the cell balancer circuit 620 and 621, where the cell balancer circuit 630 can be connected to its own controller (e.g., controller 104 shown in FIGS. 1-3) configured to control the switching elements among the cell balancer circuits 630.

The system 600 can be implemented to balance a relatively larger number of battery cells. In an example, a collective voltage of the two pairs of adjacent battery cells 601 and 602 can be greater than the collective voltage of the two pairs of adjacent battery cells 603 and 604. The controller of the cell balancer circuit 630 can activate the switching elements Q2 and Q4 of the cell balancer circuit 630 to allow charges to distribute from a flying capacitor (e.g., $C_{fly}$ shown in FIGS. 1-3) of the cell balancer circuit 630 to the two pairs of adjacent battery cells 603 and 604. A controller of the cell balancer circuit 621 can detect whether the pair of adjacent battery cells 603 or 604 has lower voltage. For example, if the pair of adjacent battery cells 604 has the lower voltage, the controller of the cell balancer circuit 621 can activate the switching elements Q2 and Q4 of the cell balancer circuit 621 to distribute charges from a flying capacitor (e.g., $C_{fly}$ shown in FIGS. 1-3) of the cell balancer circuit 621, and also charges from the cell balancer circuit 630, to the pair of adjacent battery cells 604.

Figure 7:
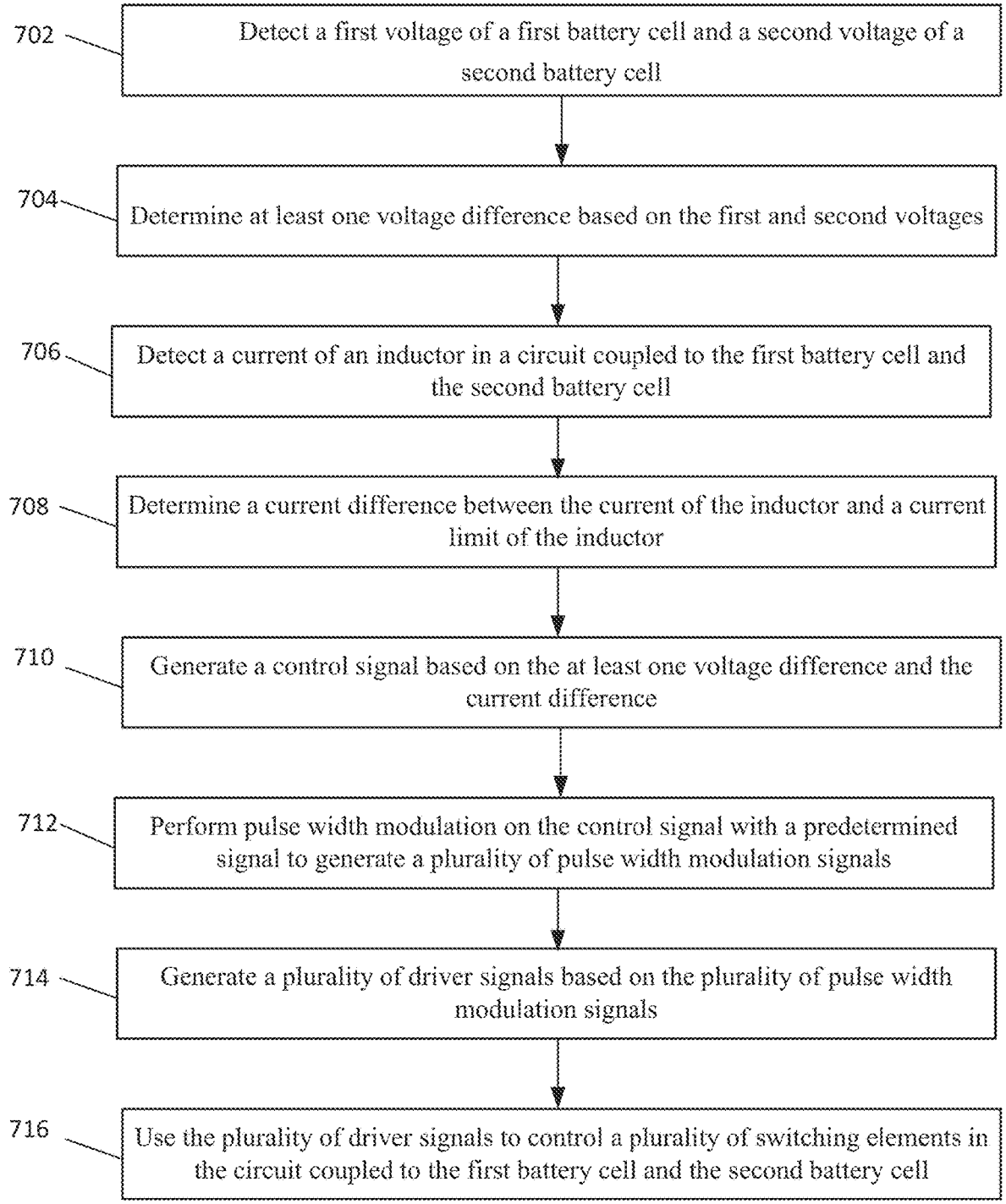
FIG. 7 is a flow diagram illustrating a process to implement bi-directional active battery cell balancing in accordance with an embodiment of the present invention

FIG. 7 illustrates a flow diagram relating to a process to implement bi-directional active battery cell balancer arranged in accordance with at least some embodiments presented herein. The process in FIG. 7 may be implemented using, for example, system 100 discussed above. An example process may include one or more operations, actions, or functions as illustrated by one or more of blocks 702, 704, 706, 708, 710, 712, 714 and/or 716. Although illustrated as discrete blocks, various blocks may be divided into additional blocks, combined into fewer blocks, eliminated, or performed in parallel, depending on the desired implementation.

The process 700 can begin at block 702, where a controller can detect a first voltage of a first battery cell and a second voltage of a second battery cell. The first battery cell and the second battery cell can be connected in a series arrangement. The process 700 can continue from block 702 to block 704. At block 704, the controller can determine at least one voltage difference based on the first and second voltages. In an example, the at least one voltage difference can include a voltage difference between the first voltage and the second voltage. In another example, the at least one voltage difference can include a first voltage difference and a second voltage difference. The determination of the at least one voltage difference can include determine an average voltage between the first and second voltages, determine a first voltage difference between the average voltage and the first voltage of the first battery cell, and determine a second voltage difference between the average voltage and the second voltage of the first battery cell.

The process 700 can continue from block 704 to block 706. At block 706, the controller can detect a current of an inductor in a circuit coupled to the first battery cell and the second battery cell. A first terminal of the inductor can be connected to a node located between the first and second battery cells. The process 700 can continue from block 706 to block 708. At block 708, the controller can determine a current difference between the current of the inductor and a current limit of the inductor. The process 700 can continue from block 708 to block 710. At block 710, the controller can generate a control signal based on the at least one voltage difference and the current difference. The process 700 can continue from block 710 to block 712. At block 712, the controller can perform pulse width modulation on the control signal with a predetermined signal to generate a plurality of pulse width modulated signals. The process 700 can continue from block 712 to block 714. At block 714, the controller can generate a plurality of driver signals based on the plurality of pulse width modulated signals.

The process 700 can continue from block 714 to block 716. At block 716, the controller can use the plurality of driver signals to control a plurality of switching elements in the circuit coupled to the first battery cell and the second battery cell. The plurality of switching elements comprises can include a first switching element, a second switching element, a third switching element, and a fourth switching element. The first switching element can be connected to the first battery cell. The second switching element can be connected to the first switching element in series arrangement. A first terminal of a capacitor in the circuit can be connected to a node located between the first and second switching elements. The third switching element can be connected to the second switching element in series arrangement. A second terminal of the inductor can be connected to a node located between the second and third switching elements. The fourth switching element can be connected to the third switching element in series arrangement. A second terminal of the capacitor can be connected to a node located between the third and fourth switching elements. The fourth switching element can be connected to the second battery cell. The first, second, third and fourth switching elements can be a metal oxide semiconductor field effect transistor (MOSFET).

In an example, the controller can activate the first switching element and the third switching element to cause current to flow from the first battery cell to the capacitor and the inductor, and to cause charges to flow from the capacitor and the inductor to the first battery cell. In another example, the controller can activate the second switching element and the fourth switching element to cause current to flow from the second battery cell to the capacitor and the inductor, and to cause charges to flow from the capacitor and the inductor to the second battery cell.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device comprising:
a controller; and
a circuit coupled to a first battery cell and a second battery cell connected in series arrangement, the circuit comprises:
   a first switching element, wherein a terminal of the first switching element is connected to a terminal of the first battery cell;
   a second switching element;
   a third switching element;
   a fourth switching element, wherein the first, second, third, and fourth switching elements are connected in series arrangement, and a terminal of the fourth switching element is connected to a terminal of the second battery cell;
   a capacitor, wherein a first terminal of the capacitor is connected to a first node located between the first and second switching elements, and a second terminal of the capacitor is connected to a second node located between the third and fourth switching elements;
   an inductor, wherein a first terminal of the inductor is connected to a third node located between the second and third switching elements, and a second terminal of the inductor is connected to a fourth node between the first and second battery cells; and
the controller being configured to:
   detect, from the inductor, an inductor current flowing through the inductor;
   compare the detected inductor current from the inductor with a programmable current limit stored in a local memory of the controller;

determine a charging status of the capacitor based on a result of the comparison between the detected inductor current from the inductor and the programmable current limit, wherein:
the detected inductor current from the inductor being greater than the programmable current limit indicates that the charging status of the capacitor is being charged; and
the detected inductor current from the inductor being less than the programmable current limit indicates that the charging status of the capacitor is being discharged;
determine that voltage levels of the first and second battery cells are unbalanced;
in response to the determination that the voltage levels of the first and second battery cells are unbalanced, generate a plurality of driver signals based on the charging status of the capacitor; and
use the plurality of driver signals to selectively drive the first, second, third, and fourth switching elements to perform battery cell balancing between the first and second battery cells, wherein the battery cell balancing between the first and second battery cells comprises:
in response to the charging status indicating that the capacitor is charged, generate the plurality of driver signals to discharge the capacitor to charge one of the first and second battery cells that has a lower voltage level;
in response to the charging status indicating that the capacitor is not charged:
generate the plurality of driver signals to charge the capacitor using one of the first and second battery cells that has a higher voltage level; and
in response to the charging status indicating that the capacitor is charged, discharge the capacitor to charge one of the first and second battery cells that has the lower voltage level,
wherein a balancing speed of the battery cell balancing between the first and second battery cells is dependent on the programmable current limit stored in the local memory of the controller.

2. The device of claim 1, wherein the capacitor is a first capacitor, and the device further comprises:
a second capacitor, wherein a first terminal of the second capacitor is connected to a fifth node located between the first switching element and the first battery cell, and a second terminal of the second capacitor is connected to the second terminal of the inductor; and
a third capacitor, wherein a first terminal of the third capacitor is connected to a sixth node located between the fourth switching element and the second battery cell, and a second terminal of the third capacitor is connected to the second terminal of the inductor.

3. The device of claim 1, wherein a closed loop formed by an activation of the first switching element and the third switching element causes current to flow from the first battery cell to the capacitor and the inductor, and causes charges to flow from the capacitor and the inductor to the first battery cell.

4. The device of claim 1, wherein a closed loop formed by an activation of the second switching element and the fourth switching element causes current to flow from the second battery cell to the capacitor and the inductor, and causes charges to flow from the capacitor and the inductor to the second battery cell.

5. The device of claim 1, wherein the first, second, third, and fourth switching elements are selectively driven under a switching speed defined by a predetermined waveform, and the plurality of driver signals are based on a pulse width modulation with the predetermined waveform.

6. The device of claim 1, wherein:
in response to a voltage level of the first battery cell being greater than a voltage level of the second battery cell, the controller is configured to use the plurality of driver signals to selectively drive the first, second, third, and fourth switching elements to cause charges to flow from the first battery cell to the second battery cell; and
in response to a voltage level of the second battery cell being greater than a voltage level of the first battery cell, the controller is configured to use the plurality of driver signals to selectively drive the first, second, third, and fourth switching elements to cause charges to flow from the second battery cell to the first battery cell.

7. A system comprising:
a first battery cell;
a second battery cell;
a circuit coupled to the first battery cell and the second battery cell, the circuit comprises:
a first switching element, wherein a terminal of the first switching element is connected to a terminal of the first battery cell;
a second switching element;
a third switching element;
a fourth switching element, wherein the first, second, third, and fourth switching elements are connected in series arrangement, and a terminal of the fourth switching element is connected to a terminal of the second battery cell;
a capacitor, wherein a first terminal of the capacitor is connected to a first node located between the first and second switching elements, and a second terminal of the capacitor is connected to a second node located between the third and fourth switching elements;
an inductor, wherein a first terminal of the inductor is connected to a third node located between the second and third switching elements, and a second terminal of the inductor is connected to a fourth node between the first and second battery cells; and
a controller connected to the circuit, the controller being configured to:
detect, from the inductor, an inductor current flowing through the inductor;
compare the detected inductor current from the inductor with a programmable current limit stored in a local memory of the controller;
determine a charging status of the capacitor based on a result of the comparison between the detected inductor current from the inductor and the programmable current limit, wherein:
the detected inductor current from the inductor being greater than the programmable current limit indicates that the charging status of the capacitor is being charged; and
the detected inductor current from the inductor being less than the programmable current limit indicates that the charging status of the capacitor is being discharged;
determine that voltage levels of the first and second battery cells are unbalanced;
in response to the determination that the voltage levels of the first and second battery cells are unbalanced, generate a plurality of driver signals based on the charging status of the capacitor; and
use the plurality of driver signals to selectively drive the first, second, third, and fourth switching elements to perform battery cell balancing between the first and second battery cells, wherein the battery cell balancing between the first and second battery cells comprises:
in response to the charging status indicating that the capacitor is charged, generate the plurality of driver signals to discharge the capacitor to charge one of the first and second battery cells that has a lower voltage level;
in response to the charging status indicating that the capacitor is not charged:
generate the plurality of driver signals to charge the capacitor using one of the first and second battery cells that has a higher voltage level; and
in response to the charging status indicating that the capacitor is charged, discharge the capacitor to charge one of the first and second battery cells that has the lower voltage level,
wherein a balancing speed of the battery cell balancing between the first and second battery cells is dependent on the programmable current limit stored in the local memory of the controller, the programmable current limit is for setting a range of allowable inductor current flowing through the inductor.

8. The system of claim 7, wherein the capacitor is a first capacitor, and the circuit further comprises:
a second capacitor, wherein a first terminal of the second capacitor is connected to a fifth node located between the first switching element and the first battery cell, and a second terminal of the second capacitor is connected to the second terminal of the inductor; and
a third capacitor, wherein a first terminal of the third capacitor is connected to a sixth node located between the fourth switching element and the second battery cell, and a second terminal of the third capacitor is connected to the second terminal of the inductor.

9. The system of claim 7, wherein the controller comprises:
a first amplifier configured to determine a voltage difference between the voltage levels of the first and second battery cells;
a second amplifier configured to determine a current difference between the inductor current of the inductor and a current limit of the inductor;
a signal generator configured to generate a control signal based on the voltage difference and the current difference;
a pulse width modulator configured to perform pulse width modulation on the control signal with a predetermined signal to generate a plurality of pulse width modulated signals; and
a gate driver configured to generate the plurality of driver signals based on the plurality of pulse width modulator signals.

10. The system of claim 7, wherein the controller comprises:
an averager configured to determine an average voltage between a first voltage of the first battery cell and a second voltage of the second battery cell;
a first amplifier configured to determine a first voltage difference between the average voltage and the first voltage of the first battery cell;

a second amplifier configured to determine a second voltage difference between the average voltage and the second voltage of the second battery cell;
a third amplifier configured to determine a current difference between the inductor current of the inductor and a current limit of the inductor;
a first signal generator configured to generate a control signal based on the first voltage difference and the current difference;
a second signal generator configured to generate a second control signal based on the second voltage difference and the current difference;
a pulse width modulator configured to perform pulse width modulation on the first control signal, the second control signal, and a predetermined signal to generate a plurality of pulse width modulator signals; and
a gate driver configured to generate the plurality of driver signals based on the plurality of pulse width modulator signals.

11. The system of claim 7, wherein a closed loop formed by an activation of the first switching element and the third switching element causes current to flow from the first battery cell to the capacitor and the inductor, and causes charges to flow from the capacitor and the inductor to the first battery cell.

12. The system of claim 7, wherein a closed loop formed by an activation of the second switching element and the fourth switching element causes current to flow from the second battery cell to the capacitor and the inductor, and causes charges to flow from the capacitor and the inductor to the second battery cell.

13. The system of claim 7, wherein the controller is configured to:
identify at least one switching element among the first, second, third, and fourth switching elements based on the detected inductor current; and
activate the at least one identified switching element to perform the battery cell balancing between the first and second battery cells.

14. A method for balancing a pair of battery cells, the method comprising:
detecting a first voltage of a first battery cell and a second voltage of a second battery cell, wherein the first battery cell and the second battery cell are connected in a series arrangement; and
determining at least one voltage difference based on the first and second voltages;
based on the at least one voltage difference, determining voltage levels of the first and second battery cells are unbalanced;
detecting from an inductor, an inductor current flowing through the inductor, wherein the inductor is in a circuit coupled to the first battery cell and the second battery cell, and a first terminal of the inductor is connected to a node located between the first and second battery cells;
comparing the detected inductor current from the inductor with a programmable current limit stored in a local memory of a controller;
based on a result of the comparison between the detected inductor current from the inductor and the programmable current limit, determining a charging status of a capacitor connected to a first node and a second node, wherein the first node is located between a first switching element and a second switching element, the second node is located between a third switching element and a fourth switching element, and wherein:

the detected inductor current from the inductor being greater than the programmable current limit indicates that the charging status of the capacitor is being charged; and the detected inductor current from the inductor being less than the programmable current limit indicates that the charging status of the capacitor is being discharged;

in response to the determination that the voltage levels of the first and second battery cells are unbalanced, generating a control signal based on the charging status of the capacitor;

performing pulse width modulation on the control signal with a predetermined signal to generate a plurality of pulse width modulated signals;

generating a plurality of driver signals based on the plurality of pulse width modulated signals; and using the plurality of driver signals to selectively drive a plurality of switching elements in a circuit coupled to the first battery cell and the second battery cell to perform battery cell balancing between the first and second battery cells, wherein the battery cell balancing between the first and second battery cells comprises:

in response to the charging status indicating that the capacitor is charged, generating the plurality of driver signals to discharge the capacitor to charge one of the first and second battery cells that has a lower voltage level;

in response to the charging status indicating that the capacitor is not charged:

generating the plurality of driver signals to charge the capacitor using one of the first and second battery cells that has a higher voltage level; and in response to the charging status indicating that the capacitor is charged, discharging the capacitor to charge one of the first and second battery cells that has the lower voltage level, wherein a balancing speed of the battery cell balancing between the first and second battery cells is dependent on the programmable current limit.

15. The method of claim 14, further comprising activating the first switching element and the third switching element to cause current to flow from the first battery cell to the capacitor and the inductor, and to cause charges to flow from the capacitor and the inductor to the first battery cell.

16. The method of claim 14, further comprising activating the second switching element and the fourth switching element to cause current to flow from the second battery cell to the capacitor and the inductor, and to cause charges to flow from the capacitor and the inductor to the second battery cell.

17. The method of claim 14, wherein the at least one voltage difference comprises a voltage difference between the first voltage and the second voltage.

18. The method of claim 14, wherein the at least one voltage difference comprises a first voltage difference and a second voltage difference, and determining the at least one voltage difference based on the first and second voltages comprises:

determining an average voltage between the first and second voltages;

determining a first voltage difference between the average voltage and the first voltage of the first battery cell; and determining a second voltage difference between the average voltage and the second voltage of the first battery cell.

* * * * *